United States Patent
Rielau et al.

(10) Patent No.: US 11,507,566 B2
(45) Date of Patent: Nov. 22, 2022

(54) MANAGING OBJECTS IN SHARED CACHES USING MULTIPLE CHAINS

(71) Applicant: salesforce.com, inc., San Francisco, CA (US)

(72) Inventors: Serge Philippe Rielau, Alamo, CA (US); Rui Zhang, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 308 days.

(21) Appl. No.: 16/779,475

(22) Filed: Jan. 31, 2020

(65) Prior Publication Data

US 2021/0240697 A1   Aug. 5, 2021

(51) Int. Cl.
  *G06F 16/00* (2019.01)
  *G06F 16/23* (2019.01)
  *G06F 16/2455* (2019.01)

(52) U.S. Cl.
  CPC .... *G06F 16/2379* (2019.01); *G06F 16/24552* (2019.01)

(58) Field of Classification Search
  CPC .......... G06F 16/2379; G06F 16/24552; G06F 16/258; G06F 16/254; G01H 10/60
  See application file for complete search history.

(56) References Cited

U.S. PATENT DOCUMENTS

| | | | | |
|---|---|---|---|---|
| 8,667,001 | B2* | 3/2014 | Dinker | G06F 12/0842 707/758 |
| 9,612,754 | B1* | 4/2017 | Delgado | G06F 16/13 |
| 2008/0250203 | A1* | 10/2008 | Schreter | G06F 9/52 711/E12.07 |
| 2013/0238866 | A1* | 9/2013 | Meiners | G06F 9/5022 711/170 |
| 2013/0276070 | A1* | 10/2013 | Lee | G06F 21/45 726/4 |
| 2014/0025897 | A1 | 1/2014 | Iyengar | |
| 2016/0328301 | A1* | 11/2016 | Parakh | G06F 11/1441 |
| 2017/0185645 | A1 | 6/2017 | Agarwal et al. | |
| 2018/0081959 | A1 | 3/2018 | Chatterjee et al. | |
| 2019/0317843 | A1* | 10/2019 | Zhao | G06F 11/3037 |
| 2019/0370366 | A1* | 12/2019 | Scott | G06F 16/9024 |
| 2020/0348867 | A1* | 11/2020 | Chanler | G06F 3/0611 |
| 2021/0182841 | A1* | 6/2021 | Scott | G06Q 20/3678 |
| 2021/0184834 | A1* | 6/2021 | DeValve | H04L 9/50 |
| 2021/0240697 | A1* | 8/2021 | Rielau | G06F 16/2379 |

OTHER PUBLICATIONS

International Search Report and Written Opinion in PCT Appl. No PCT/US2021/015808 dated Apr. 21, 2021, 11 pages.

* cited by examiner

*Primary Examiner* — Noosha Arjomandi
(74) *Attorney, Agent, or Firm* — Kowert, Hood, Munyon, Rankin & Goetzel, P.C.; Dean M. Munyon (57) ABSTRACT

A method for maintaining cache of database objects using a chain set that includes multiple chains each specifying an ordering of database objects is disclosed. In response to a change of state of a particular database object, a corresponding chain is selected. The selected chain is then locked, the state of the particular database object changed, and then the selected chain is unlocked.

20 Claims, 9 Drawing Sheets

MANAGING OBJECTS IN SHARED CACHES USING MULTIPLE CHAINS

BACKGROUND

Technical Field

This disclosure generally relates to accessing a database, in particular to managing objects associated with the database.

Description of the Related Art

Cloud application development platforms may allow individual enterprise and software as a service vendors to develop robust, reliable, and Internet-scale applications. Such applications may be used to access a database and process information retrieved from the database. Some data may be computationally expensive to generate and some data may change infrequently. Further, some data may be used by multiple users across an application or organization.

As part of the deployment of applications, the deployment platforms may allow for the creation of database objects to assist in the retrieval and processing of information from a database. Such database objects may include query plans that are used to optimize and improved performance of queries performed over a large number of records, as well as functions, which have been customized to a particular user's needs.

A process performing operations associated with the database may modify or manipulate a database object. When other processes attempt to use a database object, they may not be using a current version of the database object. In order to allow the other processes to access correct versions of modified database objects in a synchronized fashion, the database objects may be stored in a shared memory region.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

In a multi-tenant database system that serves an application, the deployment of an application may include the creation of multiple database objects. Such database objects may include customized versions one or more functions to suit an individual user's needs. Along with such user-defined functions, the database objects may also include plans to optimize and organize access to a database may also be generated. In some cases, when a user-defined application or an application supplied with the development platform are upgraded, new versions of the functions and plans may be generated.

In some multi-tenant database system, database objects may be stored in designated regions within main memory referred to as "shared memory." The compilation of functions and the generation of query plans can be expensive. Caching database objects created during such compilation operations, allows reuse of the database objects and avoids the cost of recompiling the objects, thereby improving the efficiency of the database system. Database objects stored in shared memory may be accessed by multiple processes that are accessing the database, thereby allowing changes applied to a particular database object made by one process to be shared by other processes. In some cases, different types of database objects may be stored in respective cache memories (or simply "caches") located within the shared memory. For example, user-defined functions may be stored in a one cache memory, while plans may be stored in a separate cache memory.

In a computer system, shared memory is of limited size, preventing all of the database objects from being stored in shared memory at a given time. In many situations, effective use of available shared memory may be accomplished by storing most recently used database objects in the shared memory, and evicting less frequently used database objects. To manage the shared memory in this fashion, the usage of database objects stored in shared memory needs to be tracked.

Various techniques may be employed to track the usage of database objects stored in shared memory. On technique involves maintaining a data structure referred to as a chain that specifies an ordering, by usage, of database objects stored in shared memory. The ordering may be based on how recently the database objects in the shared memory are used. For example, a least recently-used ("LRU") chain specifies an ordering where a database object that is the most recently-used occupies an initial position (or "head position") of the chain, while a database object that is the least recently-used occupies the last (or "tail") position in the chain.

When a given database object is created and added to the shared memory, it is added to the head of the LRU chain. As database objects are accessed, their respective positions within the chain are modified. For example, when a particular database object is used, its current position within the LRU chain is moved to the head position in the chain, so that the particular database object advances towards the head of the chain. The process of moving a database object's position with a chain to the head of the chain is referred to as "promoting the database object." By promoting database objects that are often used, the more recently-used objects will be located towards the head of chain, while database objects that have not been used in while, are located towards the tail of the chain.

Each time a new database object is added to the shared memory, the available space of the shared is checked. In cases where there is insufficient available space to store the new database object, a database object previously stored in the shared memory is selected for eviction from the shared memory. In systems where an LRU chain is maintained, the database object occupying the tail position of the LRU chain is selected for eviction. The likelihood of a database object that is located at the end of an LRU chain being needed is low. Therefore, evicting the tail object minimizes the impact on database performance.

When the LRU chain is modified to add, remove, or promote a database object, the process(es) performing the aforementioned modifications must obtain exclusive access to the chain using locks to provide synchronized access the LRU chain. When a given process is granted a lock on the LRU chain, other processes are prevented from accessing the LRU chain to make their respective modifications. The inventors have realized that given the large number of database objects tracked by an LRU chain, the time required to traverse the LRU in order to make the needed modifications reduces system performance by hindering other processes attempting to access the LRU chain. The embodiments illustrated in the drawings and described below provide techniques for tracking usage of database objects that improve overall system performance.

Figure 1:
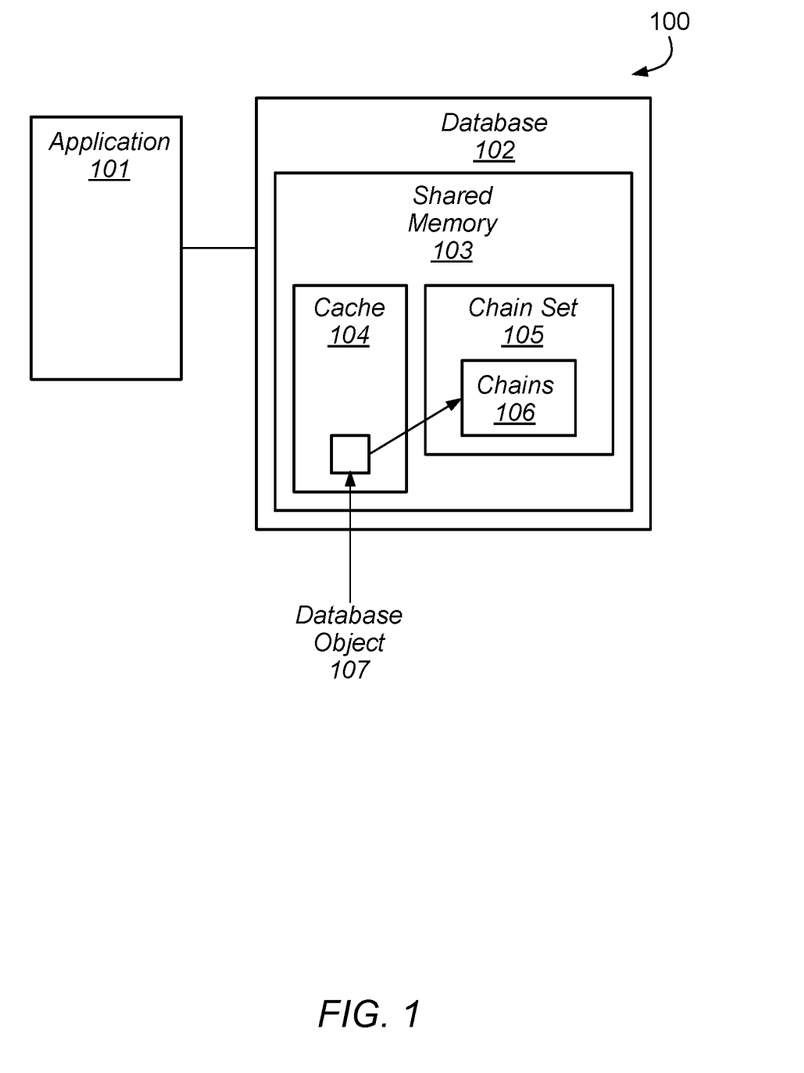
FIG. 1 is a block diagram of an application accessing an object in a shared memory.

An embodiment of a computer system is illustrated in FIG. 1. As illustrated, computer system 100 executes application 101 to access database 102. In various embodiments, computer system 100 may be a particular embodiment of a multi-tenant database system that allows multiple users to access database 102 over a computer network.

Database 102 includes shared memory 103, which includes cache 104. Multiple database objects, including database object 107 may be stored in cache 104. As used herein, a database object refers to user-defined function, access plans, etc., that allow an application to perform specific tasks on a database. As described below in more detail, a size of shared memory 103 may be based on an amount storage available to database 102. It is noted that although a single cache is depicted as being include in shared memory 103, in other embodiments any suitable number of caches may be employed.

Computer system 100 maintains chain set 105 and chains 106, where each chain of chain set 105 specifies an order of database objects stored in cache 104. As described below in more detail, chains 106 may include multiple links that link the database objects in the specified order. Although only a single chain set with a single set of chains is depicted in FIG. 1, in other embodiments, multiple chain sets, each with multiple sets of chains may be employed.

In addition to maintaining chain set 105 and chains 106, computer system 100 monitors respective states of the database objects stored in cache 104. As used herein, a state of a database object may refer to when the database object was last used, when the database object was added to a cache, and the like. For example, in monitoring a state of a given database object, computer system 100 may track when the given database object was accessed by an application. In some embodiments, computer system 100 may gather additional metrics on the state of the shared memory 103. For example, computer system 100 may track a number of non-empty chains, record a highest number of non-empty chains, and track a number of chain garbage-collection events.

In response to determining that a state of database object 107 has changed, computer system 100 selects a particular one of chains 106 corresponding to database object 107. The selection of the particular one of chains 106 may be based, at least in part, on in which chain links to database object 107 reside. In the case of multiple releases of an application, database objects from different releases may be located in corresponding chains.

Once the particular chain has been selected, the computer system updates the particular chain without preventing other ones of chains 106 from being access during the updating. By allowing access to other ones of chains 106, updates to other database objects in the other chains may be performed in parallel, without having to wait for the update of the particular chain to be completed. Such parallel accesses may, in various embodiment, improve the performance of computer system 100.

In various embodiments, updating the particular chain includes locking the particular chain. The lock on the particular chain prevents other processes from accessing the particular chain while the update is progress, thereby ensuring that the other processes do not access the particular chain in mid-update. Once locked, the particular chain is changed to reflect the state of the particular database object. As described below, changing the chain may include modifying one or more links included in the particular chain. Once the update has been completed, the particular chain is unlocked, allowing other processes to access the chain with the updated information in place.

Figure 2:
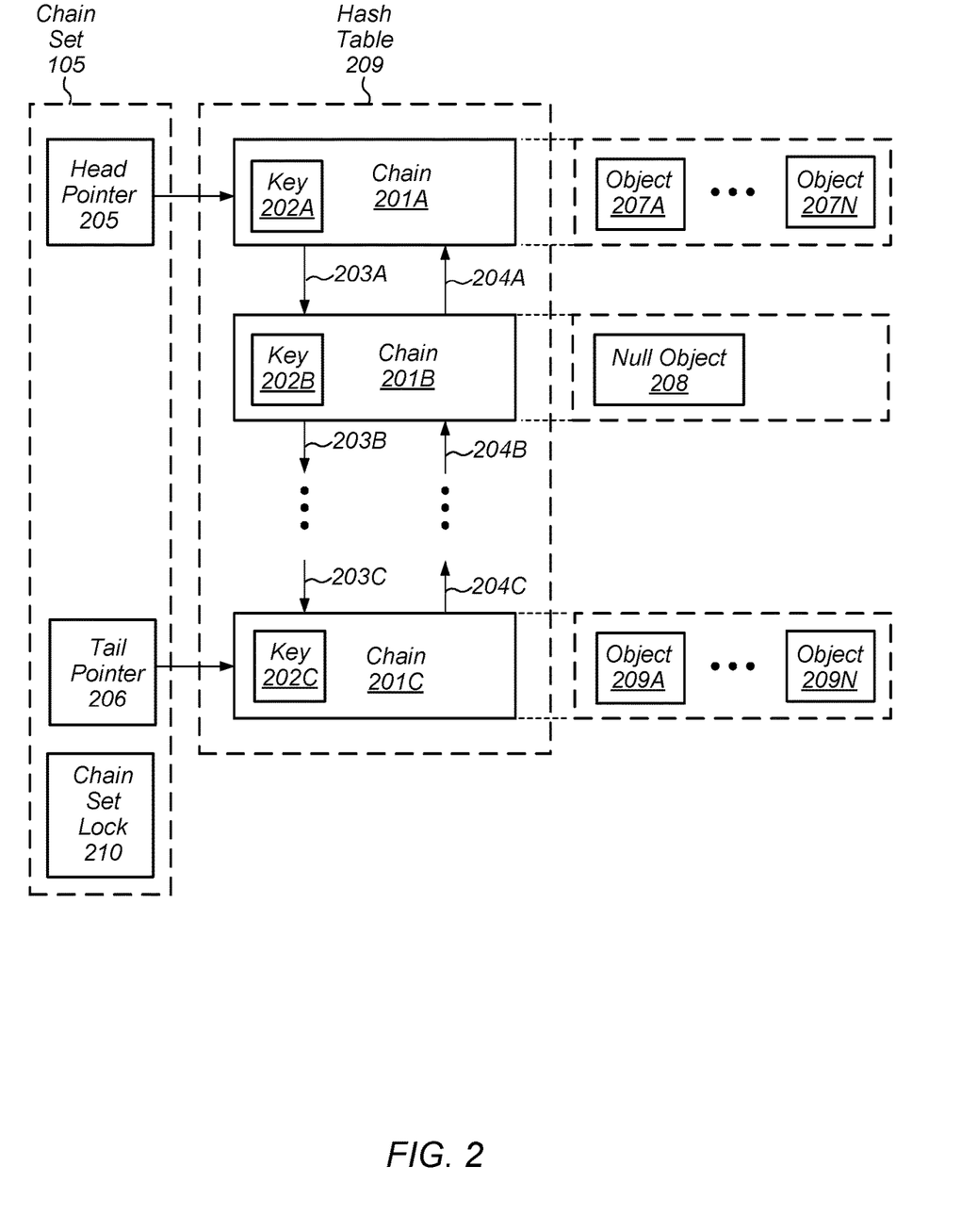
FIG. 2 is a block diagram of a chain set.

Turning to FIG. 2, a block diagram of an embodiment of chain set 105 and its associated hash table is depicted. As illustrated, chains 201A-201C are stored in hash table 209.

Chain set 105 maintains a list of all of the chains stored within hash table 209. This list can be accessed via head pointer 205 and tail pointer 206.

When a new chain is created, the new chain is appended to the tail of the list, and tail pointer 206 is updated accordingly. The list maintained by chain set 105 may, in some embodiments, facilitate the sequential scan of all of the chains, and is used during the invalidation and eviction of database objects, which rely on iterating through the chains from the chain set. In a similar fashion, when a chain is removed from the list during garbage collection, one or both of head pointer 205 and tail pointer 206 may be updated.

Each of chains 201A-201C may be identified by keys 202A-202C. Each key is unique and may be a sorted array of namespace identifiers. As used herein, a namespace refers to where data types used by a function are define or where tables referenced by a plan are defined. Such data types may include, in various embodiments, argument types, return types, local variable types, and the like. The namespaces may be recorded during function compilation for an application. In some cases, there may be a maximum number of namespaces allowed for a given database object.

Chains 201A-201C are doubly-linked by forward links 203A-203C and backward links 204A-204C within hash table 209, using a linked-list structure. Links 203A-203C may point to a next chain in the list, and links 204A-204C may point to a previous chain in the list. It is noted that although only three chains are depicted as being included in hash table 209, in other embodiments, any suitable number of chains may be included in hash table 209. In some case, a maximum number of chains that can be included in hash table 209 may be based, at least in part, on an available amount of storage in shared memory 103. The maximum number of chains within hash table 209 and may be configured during the initialization of caches within shared memory 103.

Each of chains 201A-201C specifies an ordering of a corresponding set of database objects stored in shared memory 103. As described below in more detail, the ordering may be specified by using links between the database objects. For example, chain 201A specifies an ordering for object 207A through object 207N, chain 201B has no database objects assigned to it as noted by Null Object 208, and chain 201C specifies an ordering for object 209A through object 209B.

In some cases, each of chains 201A-201C may correspond to different releases or versions of an application, as a new application release typically introduces new namespaces. For example, chain 201A may specify an ordering for database objects associated with a first release of an application, while chain 201B may specify an ordering for database objects associated with a second different release of the application.

When a new database object is ready to be cached, a routine is executed to obtain a target chain into which the new database object is to be attached. In some embodiments, the function to obtain the target chain will check hash table 209. If this target chain already exists within hash table 209, then the new database object will be added to the chain. If, however, there are no chains that correspond to the new database object available within hash table 209, a different routine will be executed to create a new chain, and the new database object will be added to the newly-created chain.

As described below, database objects may be removed from a chain as they are no longer needed. When a last database object has been removed from a particular chain, the chain becomes empty. The empty chain, however, is not immediately removed from hash table 209. Instead, when a new chain is created and a total number of chains within hash table 209 exceeds a threshold value, a garbage collection routine is performed. During the execution of the garbage collection routine, empty chains are removed from hash table 209 to free up space within hash table 209 to accommodate the space required by the new chains. By performing garbage collection along with the addition of a chain, program code for both the creation and removal of chains may be organized in a single routine. As such, the execution of the single routine only requires a single acquisition of chain set lock 210 in exclusive mode, which prevents other processes to access the chain set. Locking a chain set in this fashion may be rare event once a deployment or release of an application is completed and the application is stable, at which point the introduction of new namespaces becomes rare. During read-only access to the chain set, i.e., access for looking up information included in one of the chains in the chain set, chain set lock 210 is held in a shared mode that still allows other processes access for information lookup. Note that when the chain set is locked in shared mode, an attempt to acquire the chain set lock in exclusive mode will be blocked. In other words, when a process is accessing the chain set, modification to the chain set at the same time is prevented.

Figure 3:
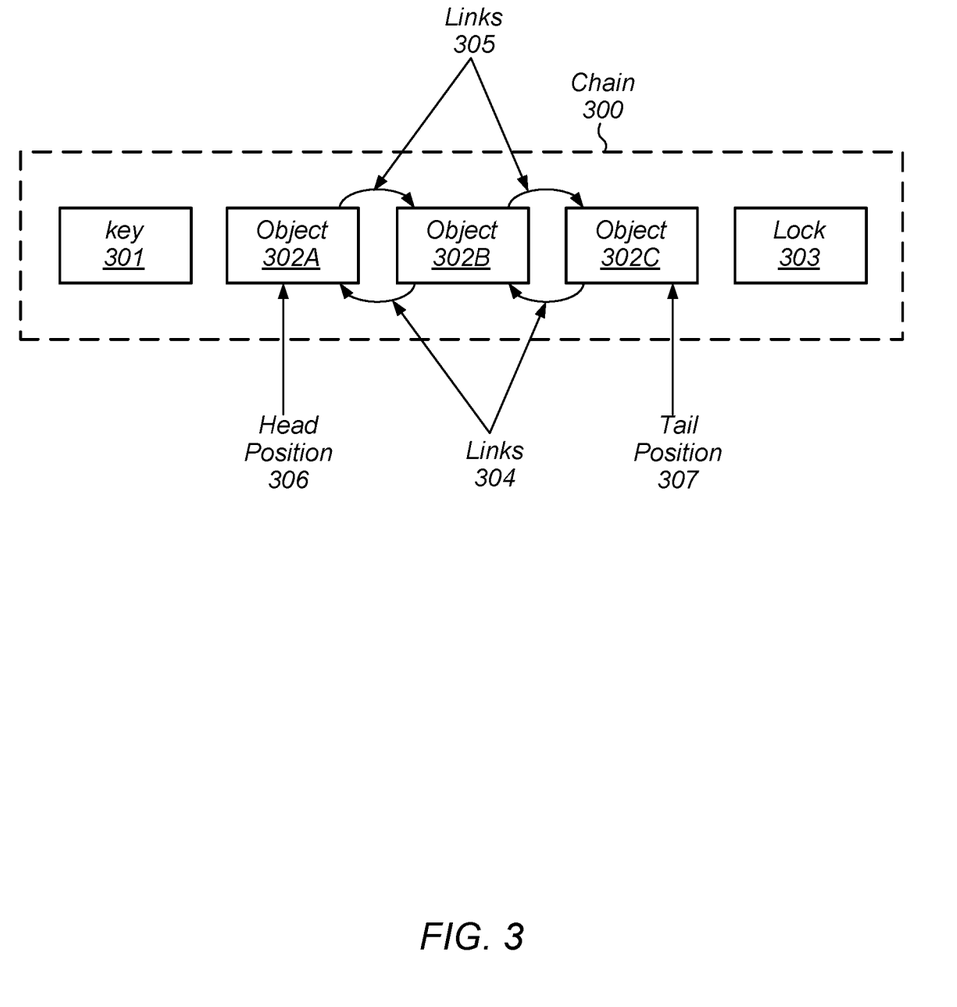
FIG. 3 is a block diagram of a chain.

Chains, such as those described above, may be implemented in various ways. A particular embodiment of a chain is depicted in FIG. 3. As illustrated, chain 300 includes key 301, objects 302A-302C, and lock 303. It is noted that chain 300 may correspond to any of chains 106, or 201A-201C. It is noted that any of objects 302A-302C may correspond to database object 105 as illustrated in FIG. 1.

An ordering of objects 302A-302C is specified by links 304 and 305. In some cases, the actual database objects corresponding to objects 302A-302C, may not be included in chain 300, but rather just pointers to locations within a cache included in shared memory 103 that contain the actual data. In a similar fashion, links 304 and 305 may include pointers to locations within the cache included in shared memory 103 that correspond to objects 302A-302C.

As illustrated, each of objects 302A-302C is associated with two links; one points to a previous object in the ordering, and the other points to a next object in the ordering. Although each of objects 302A-302C is depicted as being associated with two links, in other embodiments, only a single link per object may be employed. In various embodiments, a most recently-used one of objects 302A-302C may be located in head position 306, while a least recently-used one of objects 302A-302C may be located in tail position 307. It is noted that although only three objects are depicted in the embodiment of FIG. 3, in other embodiments, chain 300 may include any suitable number of objects.

When a new object is added to chain 300, the new object is added at head position 306. Links 304 and 305 are adjusted to reflect the position of the newly added object. When an object is removed from chain 300, links 304 and 305 are changed to re-link other ones of objects 302A-302C around the position vacated by the newly deleted object. When a given one of objects 302A-302C is used, chain 300 is locked and links 304 and 305 are adjusted to promote the given one of objects 302A-302C towards head position 306.

In various embodiments, when it is necessary to remove an object from a chain, an oldest object may be selected for eviction. A timestamp-based age calculation scheme may be employed. A global timestamp counter may be maintained by chain set 105. This counter may be incremented once a new object is added to a given chain within chain set 105. The object itself may maintain a local timestamp, which is set to the value of the global timestamp counter when the object is added to the chain or when the object is promoted to the head position of its chain.

As described elsewhere in this disclosure, different chains may correspond to different releases of an application. To differentiate between the different chains, each chain includes an identifier that contains identifying information. As illustrated, chain 300 includes key 301, which, as described above, may include data indicative of a namespace that includes the definitions of database objects, such as tables and data types, used by objects 302A-302C. Although software version or release information can be used to identify a particular chain, it is possible and contemplated that any suitable type of information may be included in key 301 to aid in identification of chain 300.

Lock 303 may include data indicative of whether the chain is current locked by a particular process. In some cases, lock 303 may include data not only noting that chain 300 has been locked, but also include data identifying a process to which the lock has been granted. Locking and unlocking chain 300 may include storing different information in lock 303 that identifies a lock state of chain 300. Although lock 303 is depicted as being included in chain 300, in other embodiments, lock 303 may be stored in a lookup table or other suitable structure instead of chain 300.

Figure 4:
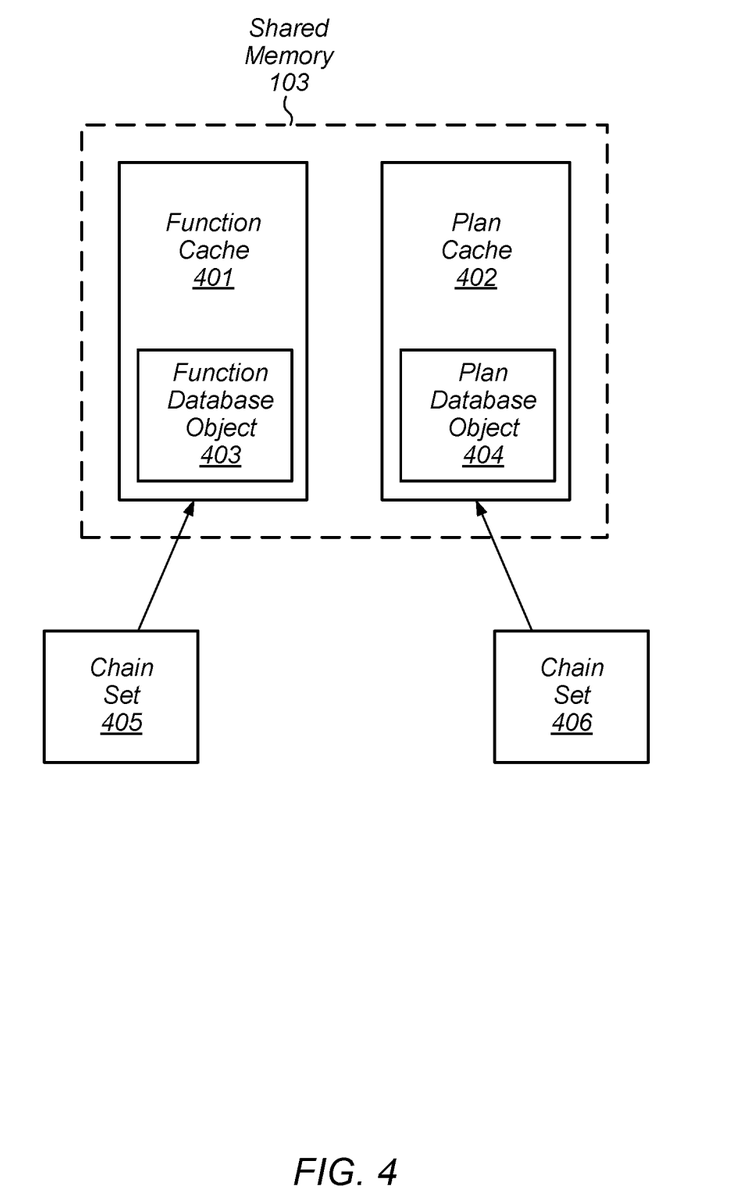
FIG. 4 is a block diagram of a shared memory.

As noted earlier, different types of database objects may be stored in different caches within a shared memory. An embodiment of shared memory 103 with multiple caches is depicted in FIG. 4. As illustrated, shared memory 103 includes function cache 401 and plan cache 402. It is noted that although two caches are depicted in the embodiment of FIG. 4, in other embodiments, any suitable number of caches may be employed. It is further noted the amount of storage allocated to function cache 401 and plan cache 402 may be based, at least in part, on an available amount of storage associated with shared memory 103. In some cases, respective amounts of storage associated with function cache 401 and plan cache 402 may be different.

Function cache 401 is configured to store database objects that correspond to functions used by one or more applications. For example, function database object 403 is included in function cache 401. In various embodiments, chain set 405 is used to track the usage of database objects stored in function cache 401. Chain set 405 may include multiple chains, each corresponding to a unique set of identifiers introduced by different releases of an application.

Plan cache 402 is configured to store database objects that correspond to Structured Query Language ("SQL") query plans used by one or more applications. As depicted, plan database object 404 is included in plan cache 402. Chain set 406 is, in various embodiments, used to track the usage of database objects stored in plan cache 402. Like chain set 405, chain set 406 may include multiple chains, each corresponding to a unique set of identifiers introduced by different releases of an application.

By employing multiple chains to organize database objects stored within a type of cache, an impact associated with the modifying a particular chain may be further remediated. For example, a given process that modifies an object in a chain within chain set 405, thus locking this chain exclusively, does not prevent other processes that modify or access other database objects attached to other chains within chain set 405, thereby maximizing concurrency and throughput during database operations. In addition, by distributing database objects across multiple chains, locating a particular database object within a particular chain requires less time compared to a situation where all the database objects are organized in just one chain.

Figure 5:
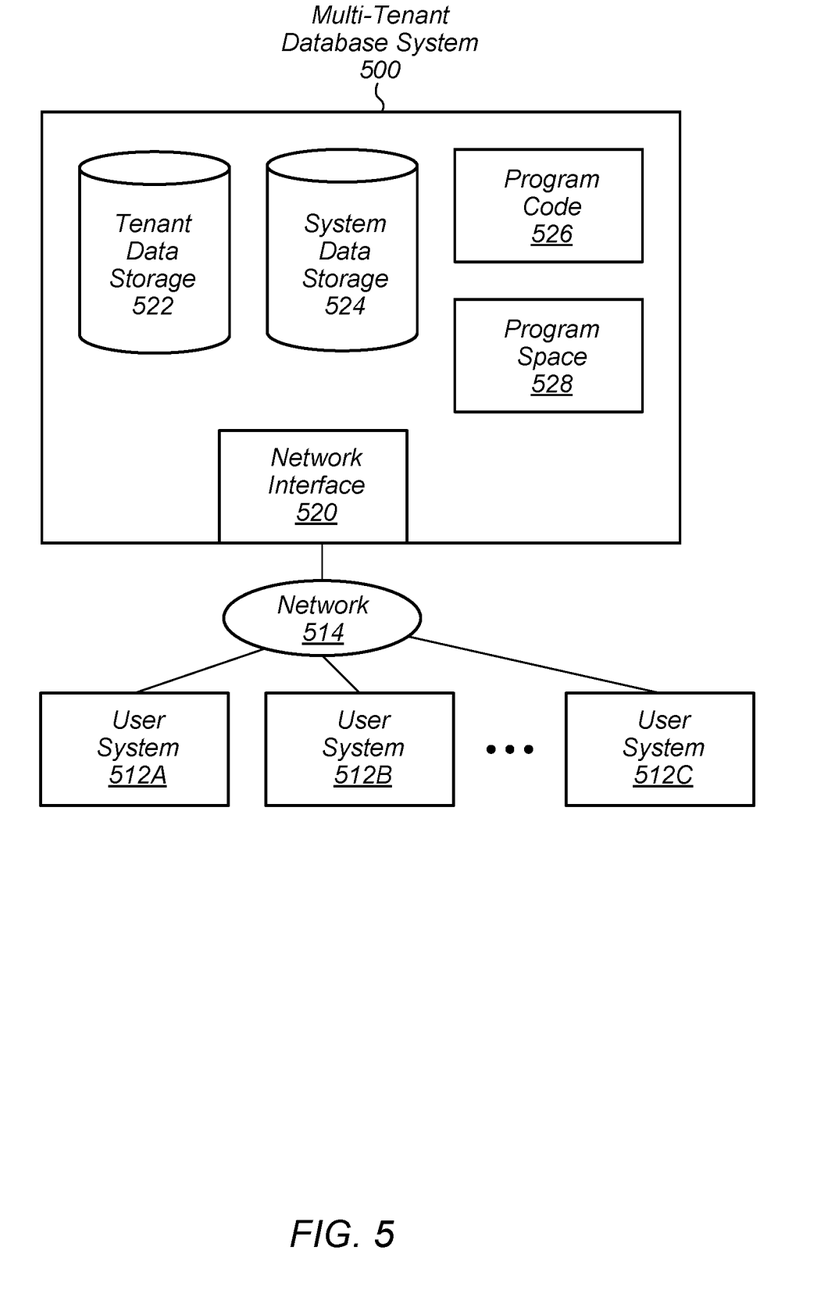
FIG. 5 is a block diagram of a multi-tenant database system.

Turning to FIG. 5, an exemplary environment in which a multi-tenant database and cache system might be implemented is illustrated. Note that the disclosed multi-tenant systems are included to illustrative purposes but are not intended to limit the scope of the present disclosure. In other embodiments, similar techniques may be implemented in non-multi-tenant environments such as various client/server environments, cloud computing environments, clustered computers, etc.

As illustrated in FIG. 5, one or more user systems 512A-512C may interact via a network 514 with a multi-tenant database system (MTS) 500. The users of those user systems 512A-512C may be users in differing capacities and the capacity of a particular one of user systems 512A-512C might be determined by the current user. For example, when a salesperson is using a particular one of user systems 512A-512C to interact with MTS 500, that particular user system may have the capacities allotted to that salesperson. However, while an administrator is using the same user system to interact with MTS 500, it has the capacities allotted to that administrator.

Network 514 may be a LAN (local area network), WAN (wide area network), wireless network, point-to-point network, star network, token ring network, hub network, or any other appropriate configuration. The global internetwork of networks often referred to as the "Internet" with a capital "I," will be used in many of the examples herein and is one example of a TCP/IP (Transfer Control Protocol and Internet Protocol) network. It should be understood, however, that the networks that the present invention may utilize any of various other types of networks.

User systems 512A-512C may communicate with MTS 500 using TCP/IP and, at a higher network level, use other common Internet protocols to communicate, such as HTTP, FTP, AFS, WAP, etc. As an example, where HTTP is used, user systems 512A-512C might include an HTTP client commonly referred to as a "browser" for sending and receiving HTTP messages from an HTTP server at MTS 500. Such a server might be implemented as the sole network interface between MTS 500 and network 514, but other techniques might be used as well or instead. In some implementations, the interface between MTS 500 and network 514 includes load sharing functionality, such as round-robin HTTP request distributors to balance loads and distribute incoming HTTP requests evenly over a plurality of servers. Preferably, each of the plurality of servers has access to the MT S's data, at least for the users that are accessing a server.

In some embodiments, the system shown in FIG. 5 implements a web-based customer relationship management (CRM) system. For example, in some embodiments, MTS 500 includes application servers configured to implement and execute CRM software applications as well as provide related data, code, forms, web pages and other information to and from user systems 512A-512C and to store to, and retrieve from, a database system related data, objects and web page content. In embodiments of a multi-tenant system, tenant data is preferably arranged so that data of one tenant is kept separate from that of other tenants so that that one tenant does not have access to another tenant's data, unless such data is expressly shared.

One arrangement for elements of MTS 500 is shown in FIG. 5, including a network interface 520, storage 522 for tenant data, storage 524 for system data accessible to MTS

500 and possibly multiple tenants, program code 526 for implementing various functions of MTS 500 (e.g., locking a particular chain), and a process space 528 for executing MTS system processes and tenant-specific processes, such as running applications as part of an application service.

Several elements in the system shown in FIG. 5 may include conventional, well-known elements that need not be explained in detail here. For example, each user systems 512A-512C may be a desktop personal computer, workstation, laptop, PDA, cell phone, or any WAP-enabled device or any other computing device capable of interfacing directly or indirectly to the Internet or other network connection. User systems 512A-512C may execute an HTTP client, e.g., a browsing program, such as Microsoft's Edge™ browser, Google's Chrome™ browser, or a WAP-enabled browser in the case of a cell phone, PDA or other wireless device, or the like, allowing a user (e.g., subscriber of a CRM system) of user systems 512A-512C to access, process, and view information and pages available to it from MTS 500 over network 514. Each of user systems 512A-512C may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 500 or other systems or servers. As discussed above, the present invention is suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

In some embodiments, each of user systems 512A-512C and its components are operator configurable using applications, such as a browser, that include computer code executable on one or more processing elements. Similarly, in some embodiments, MTS 500 (and additional instances of MTSs, where more than one is present) and their components are operator configurable using application(s) that include computer code executable on one or more processing elements. Thus, various operations described herein may be performed by executing program instructions stored on a non-transitory computer-readable medium and executed by one or more processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VB Script.

According to one embodiment, each MTS 500 is configured to provide web pages, forms, applications, data, and/or media content to user systems 512A-512C to support the access by user systems 512A-512C as tenants of MTS 500. As such, in this embodiment, MTS 500 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, MTSs may include one or more logically and/or physically connected servers distributed locally or across one or more geographic locations. Additionally, the term "server" includes a computer system, including processing hardware and process space(s), and an associated storage system and database application as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Figure 6:
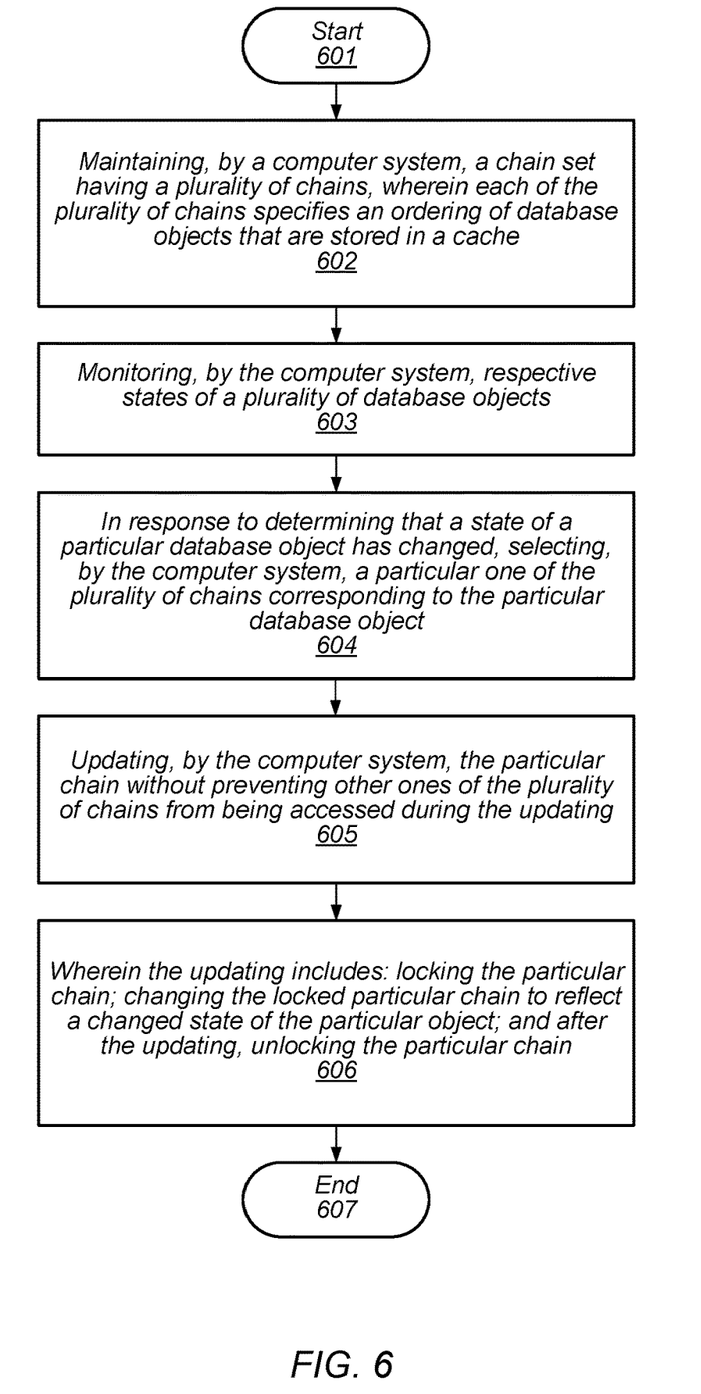
FIG. 6 illustrates a flow diagram depicting an embodiment of a method for managing objects in a shared cache.

Turning to FIG. 6, a flow diagram depicting an embodiment of a method for accessing an object in a shared memory of a computer system. The method, which may be applied to various computer systems included computer system 100, begins in block 601.

The method includes maintaining, by a computer system, a chain set having a plurality of chains, wherein each of the plurality of chains specifies an ordering of database objects that are stored in a cache (block 602). In some cases, each of the chains may specify respective orderings for database objects associated with corresponding releases of a software application. For example, a first chain of the plurality of chains may specify an ordering of a first plurality of database objects associated with a first release of a software application, and a second chain of the plurality of chains may specify an ordering of a second plurality of database objects associated with a second release of the software application different than the first release.

The method also includes monitoring, by the computer system, respective states of a plurality of database objects (block 603). In various embodiments, the monitoring may include tracking when a given database object is used by an application. Additionally, the monitoring may include noting when the given database object has been evicted from a cache or when a new database object has been added to the cache.

The method further includes, in response to determining that a state of a particular database object has changed, selecting, by the computer system, a particular one of the plurality of chains corresponding to the particular database object (block 604). In various embodiments, the selecting may include checking an identifier associated with each chain of the plurality of chains.

The method also includes updating, by the computer system, the particular chain without preventing other ones of the plurality of chains from being accessed during the updating (block 605). Since the ordering of the database objects are managed across multiple chains, locking a particular chain only affects a subset of the overall set of database objects. By locking on the particular chain, access to database objects associated with other chains is still possible, thereby improving overall system performance.

In various embodiments, the method also includes locking the particular chain, changing the locked particular chain to reflect a changed state of the particular object, and, after the updating, unlocking the particular chain as being included in the updating (block 606). In various embodiments, locking the particular chain may include setting a lock data field to a particular value indicating the particular chain is current in use. Unlocking the particular chain may include setting the lock data field to a different value indicating that the particular chain is no longer in use.

In some cases, changing the locked particular chain may include removing the particular database object from the chain. Alternatively, changing the locked particular chain may include adding the particular database object to the chain. In some cases, changing the locked particular chain may include modifying a location of the particular database object within the ordering specified in the locked particular chain. The method concludes in block 607.

In some cases, updates of a more global nature need to be made to the chains included in a chain set. During such global changes, the chain set itself is locked, thereby limiting access to the chains until a particular global change has been completed. For example, a chain set needs to be locked when an existing chain in the chain set is removed (in a process referred to as "garbage collection"), or a new chain is added to the chain set.

When a chain becomes empty it does not need to be removed from its associated chain set immediately as allocated storage for the empty chain may not be needed until a new chain is added. As such, both garbage collection and the addition of new chains may be performed together using a single lock on the chain set. By performing garbage collection during the time when a new chain is being added, overall performance of the computer system may be improved by reducing the likelihood of lock contention on the chain set. In addition, by not immediately removing an empty chain, an overhead associated with performing such a removal operation is avoided. More importantly, when a database object is added to an empty chain, an overhead associated with creating a new chain is avoided, with an empty chain being effectively reused.

Figure 7:
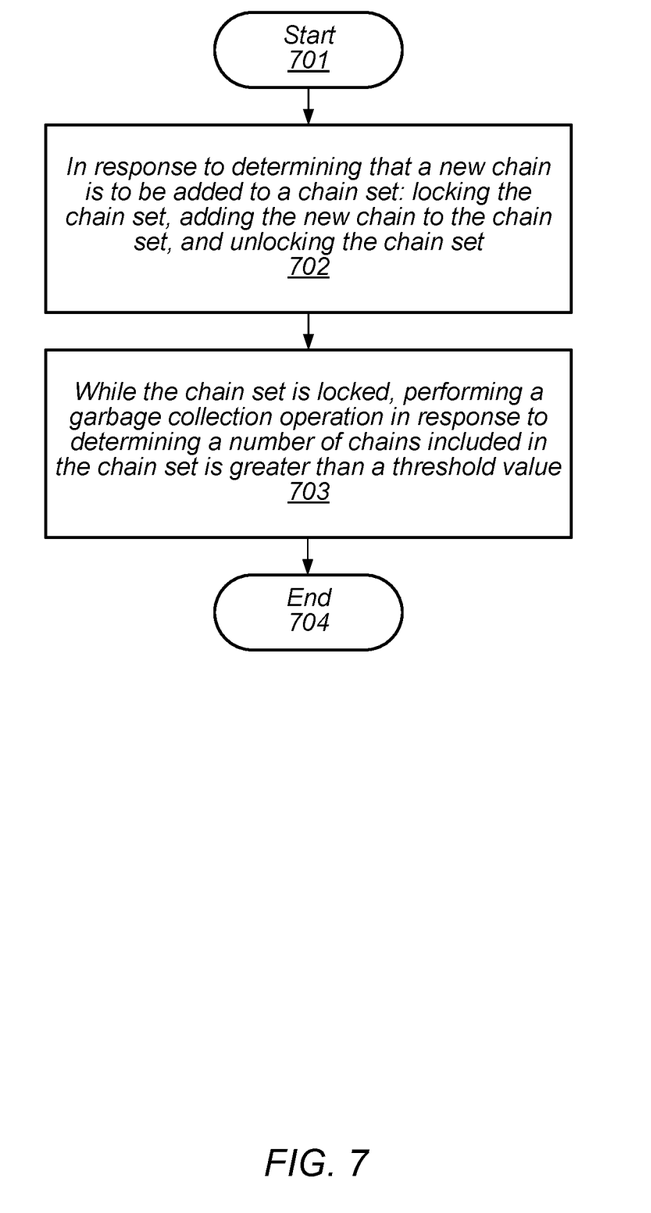
FIG. 7 illustrates a flow diagram depicting an embodiment of a method for performing garbage collection in a shared cache.

A flow diagram depicting an embodiment of a method for performing garbage collection is depicted in FIG. 7. The method, which may be applied to various computer systems, including the computer system of FIG. 1, begins in block 701.

The method includes, in response to determining that a new chain is to be added to a chain set: locking the chain set, adding the new chain to the chain set, and unlocking the chain set (block 702). In various embodiments, adding the new chain to the chain set may be in response to receiving an upgrade to an application. Versions of database objects associated with an upgraded application may be grouped together in a common chain that is added to the chain set.

The method also includes, while the chain set is locked, performing a garbage collection operation in response to determining a number of chains included in the chain set is greater than a threshold value (block 703). In various embodiments, the threshold value is based, at least in part, on an available amount of memory for storing database objects. In some embodiments, performing the garbage collection operation includes removing at least empty chains from the chain set. The method concludes in block 704.

Figure 8:
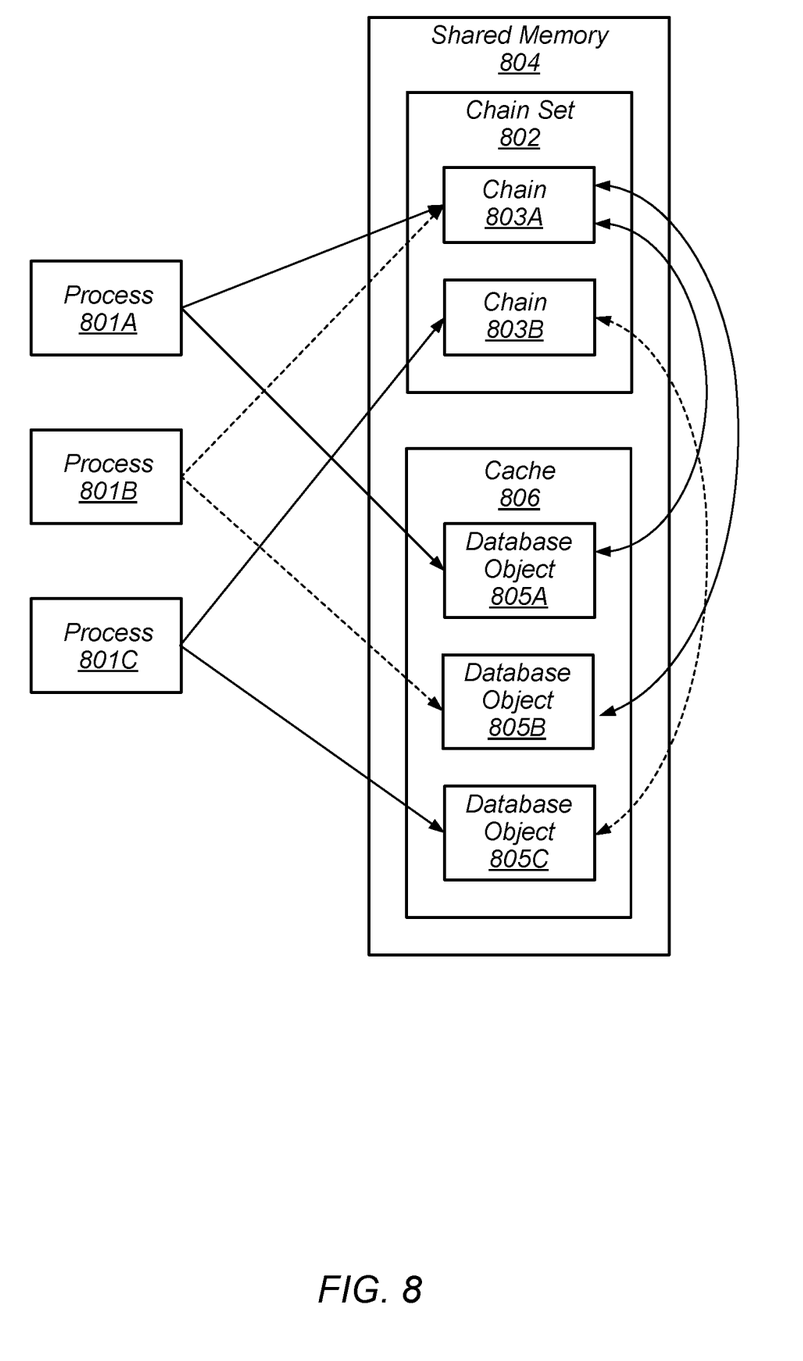
FIG. 8 is a block diagram depicting an example of two processes accessing database objects in a shared memory.

An example of three processes accessing database objects in a concurrent fashion in a shared memory is depicted in FIG. 8. As illustrated, shared memory 804 includes chain set 802 and cache 806. Chain set 802 includes chains 803A and 803B, while cache 806 includes database objects 805A-805C. The usage of database objects 805A and 805B is tracked by chain 803A, and the usage of database object 805C is tracked by chain 803B. It is noted that shared memory 804 may, in various embodiments, correspond to shared memory 103, chain set 802 may correspond to chain set 105, and cache 806 may correspond to cache 104. It is further noted that processes 801A-801C may result from the execution of application 101 on a computer system.

During operation, process 801A accesses database object 805A in shared memory 804. As a result of the access, process 801A needs to promote database object 805A within chain 803A in order to move it closer to the head of chain 803A. To perform the promotion of database object 805A, process 801A obtains a lock on chain 803A, and begins the process of changing the position of database 803A within chain 803A.

While process 801A is updating chain 803A, process 801B accesses database object 805B. In a similar fashion to the access to database object 805A, the position of database object 805B must also be updated within chain 803A. When process 801B attempts to obtain a lock on chain 803A, but cannot due to the lock currently held by process 801A. Once process 801A has completed updated chain 803A, its lock will be released, and process 801B may obtain a lock on chain 803A and perform its update. Since both database object 805A and 805B are tracked by the same chain, updates cannot be made in parallel, and one process must wait to perform its updates.

In contrast, while process 801A is updating chain 803A, process 801C accesses database object 805C. Since the usage of database object 805C is being tracked by chain 803B, process 801C needs to obtain a lock on chain 803C to update the position of database object 805C within chain 803B. Since the usage of database object 805C is tracked using a different chain than the usage of database object 805A, the updates to chains 803A and 803B can be performed in parallel, thereby improving system performance.

Although the above example depicts the promotion of database objects within their respective chains, in other embodiments, other changes in state of database variables may result in similar steps to those described above. For example, chain 803A may be locked due to the addition of a new database object, while chain 803B is locked to perform a promotion of a database object within chain 803B.

Figure 9:
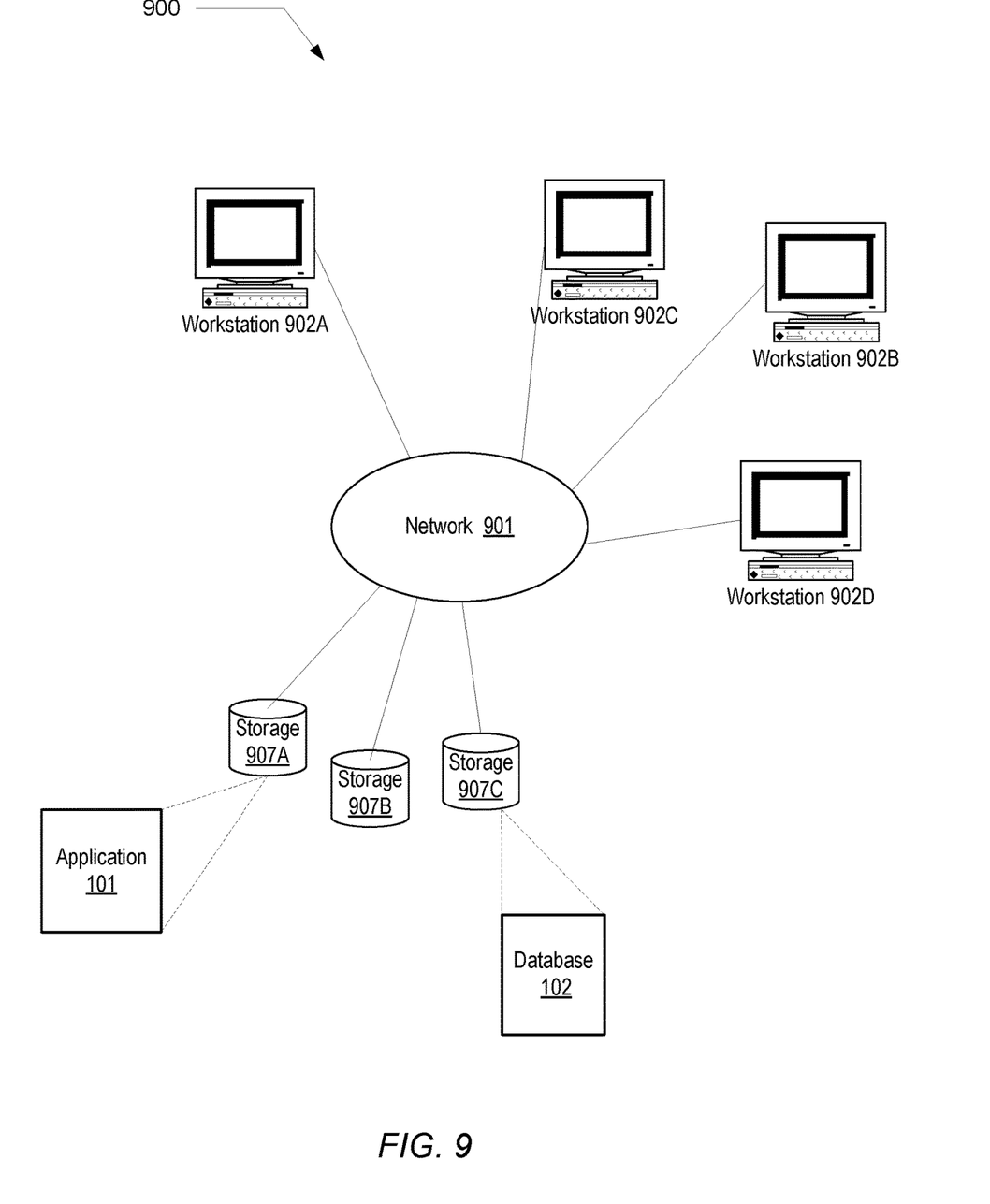
FIG. 9 is a block diagram of one embodiment of a computer system including a test broker application.

Turning to FIG. 9, a block diagram of one embodiment of a computer system including a database with a shared memory. The computer system 900 includes a plurality of workstations designated 902A through 902D. The workstations are coupled together through a network 901 and to a plurality of storages designated 907A through 907C. In one embodiment, each of workstations 902A-902D may be representative of any standalone computing platform that may include, for example, one or more processors, local system memory including any type of random access memory (RAM) device, monitor, input output (I/O) means such as a network connection, mouse, keyboard, monitor, and the like (many of which are not shown for simplicity). In some embodiments, workstations 902A-902D may be included in a server farm or other collection of compute resources for use in performing distributed computing operations.

Although depicted as being depicted as being coupled to a common network in the embodiment of FIG. 9, in other embodiments, workstations 902A through 902D may be coupled to each other, as well as storage 907A through storage 907C, via multiple networks. It is noted that although the embodiment of FIG. 9 depicts four workstations, in other embodiments, any suitable number of workstations may be employed.

In one embodiment, storages 907A-907C may be representative of any type of mass storage device such as hard disk systems, optical media drives, tape drives, ram disk storage, and the like. As such, program instructions comprising the application 101 may be stored within any of storages 907A-907C and loaded into the local system memory of any of the workstations during execution. In various embodiments, storages 907A-907C may include portable storage media that may be used directly or removed from computer system 900. Such portable storage media, the local system memory, and the mass storages may be referred to as non-transitory computer readable storage mediums.

As an example, as shown in FIG. 9, application 101 is shown stored within storage 907A, while database 102 is stored within storage 907C. In one embodiment, application 101 may be called by executed by any of workstations 902A-902D. The program instructions associated with application 101 may be executed directly from storage 907A, or transferred to the local system memory of one of workstations 902A—902D, for subsequent execution. One or more processors on a given workstation of workstations 902A-902D may execute the program instructions associated with application 101, or program instructions may be executed in a distributed fashion among multiple workstations of workstations 902A-902D, as desired.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   maintaining, by a computer system, a chain set having a plurality of chains, wherein each chain of the plurality of chains specifies an ordering of database objects that are stored in a cache;
   monitoring, by the computer system, respective states of a plurality of database objects;
   in response to determining that a state of a particular database object has changed, selecting, by the computer system, a particular one of the plurality of chains corresponding to the particular database object, wherein the particular one of the plurality of chains is selected based on a version of an application utilizing the particular database object; and
   updating, by the computer system, the particular chain without preventing other ones of the plurality of chains from being accessed during the updating, wherein the updating includes:
   locking the particular chain;
   changing the locked particular chain to reflect a changed state of the particular database object; and
   after the updating, unlocking the particular chain.

2. The method of claim 1, wherein changing the locked particular chain includes adding the particular database object to the chain.

3. The method of claim 1, wherein changing the locked particular chain includes removing the particular database object from the chain.

4. The method of claim 1, wherein the ordering of database objects that are stored in the cache is based, at least in part, on relative frequencies of use of the database objects.

5. The method of claim 1, further comprising, in response to determining, by the computer system, that a new chain is to be added to the chain set:
   locking the chain set;
   adding the new chain to the chain set; and
   unlocking the chain set.

6. The method of claim 5, further comprising, performing, by the computer system, a garbage collection operation on the chain set, in response to determining a number of chains included in the chain set is greater than a threshold value.

7. A non-transitory computer readable medium having programming instructions stored thereon that are capable of causing a computer system to implement operations comprising:
   maintaining, by the computer system, a chain set having a plurality of chains, wherein each chain of the plurality of chains specifies an ordering of database objects that are stored in a cache;
   monitoring, by the computer system, respective states of a plurality of database objects;
   in response to determining that a state of a particular database object has changed, selecting, by the computer system, a particular one of the plurality of chains corresponding to the particular database object, wherein the particular one of the plurality of chains is selected based on a version of an application utilizing the particular database object; and
   updating, by the computer system, the particular chain without preventing other ones of the plurality of chains from being accessed during the updating, wherein the updating includes:
   locking the particular chain;
   changing the locked particular chain to reflect a changed state of the particular database object; and
   after the updating, unlocking the particular chain.

8. The non-transitory computer readable storage medium of claim 7, wherein changing the locked particular chain includes adding the particular database object to the chain.

9. The non-transitory computer readable storage medium of claim 7, wherein changing the locked particular chain includes removing the particular database object from the chain.

10. The non-transitory computer readable storage medium of claim 7, wherein the ordering of database objects that are stored in the cache is based, at least in part, on relative frequencies of use of the database objects.

11. The non-transitory computer readable storage medium of claim 7, further comprising, in response to determining, by the computer system, that a new chain is to be added to the chain set:
   locking the chain set;
   adding the new chain to the chain set; and
   unlocking the chain set.

12. The non-transitory computer readable storage medium of claim 11, further comprising, performing, by the computer system, a garbage collection operation on the chain set, in response to determining a number of chains included in the chain set is greater than a threshold value.

13. The non-transitory computer readable storage medium of claim 7, wherein a first chain of the plurality of chains specifies an ordering of a first plurality of a set of database objects associated with a set of identifiers introduced by a first release of a software application, and wherein a second chain of the plurality of chains specifies an ordering of a second plurality of a set of database objects associated with a different set of identifiers introduced by a first or a second release of the software application.

14. A computer system, comprising:
  one or more memories that, during operation, store instructions, and
  one or more compute resources that, during operation, receive instructions from the one or more memories and execute the instructions to cause the computer system to perform operations including:
  maintaining, by the computer system, a chain set having a plurality of chains, wherein each chain of the plurality of chains specifies an ordering of database objects that are stored in a cache;
  monitoring, by the computer system, respective states of a plurality of database objects;
  in response to determining that a state of a particular database object has changed, selecting, by the computer system, a particular one of the plurality of chains corresponding to the particular database object, wherein the particular one of the plurality of chains is selected based on a version of an application utilizing the particular database object; and
  updating, by the computer system, the particular chain without preventing other ones of the plurality of chains from being accessed during the updating, wherein the updating includes:
    locking the particular chain;
    changing the locked particular chain to reflect a changed state of the particular database object; and
    after the updating, unlocking the particular chain.

15. The computer system of claim 14, wherein changing the locked particular chain includes adding the particular database object to the chain.

16. The computer system of claim 14, wherein changing the locked particular chain includes removing the particular database object from the chain.

17. The computer system of claim 14, wherein the ordering of database objects that are stored in the cache is based, at least in part, on relative frequencies of use of the database objects.

18. The computer system of claim 14, further comprising, in response to determining, by the computer system, that a new chain is to be added to the chain set:
  locking the chain set;
  adding the new chain to the chain set; and
  unlocking the chain set.

19. The computer system of claim 18, further comprising, performing, by the computer system, a garbage collection operation on the chain set, in response to determining a number of chains included in the chain set is greater than a threshold value.

20. The computer system of claim 14, wherein a first chain of the plurality of chains specifies an ordering of a first plurality of a set of database objects associated with a set of identifiers introduced by a first release of a software application, and wherein a second chain of the plurality of chains specifies an ordering of a second plurality of a set of database objects associated with a different set of identifiers introduced by a first or a second release of the software application.

* * * * *